US011931825B2

(12) United States Patent
Karp et al.

(10) Patent No.: US 11,931,825 B2
(45) Date of Patent: Mar. 19, 2024

(54) SYSTEM AND METHODS FOR FABRICATING A COMPONENT WITH LASER ARRAY

(71) Applicant: General Electric Company, Schenectady, NY (US)

(72) Inventors: Jason Harris Karp, Niskayuna, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/990,984

(22) Filed: Nov. 21, 2022

(65) Prior Publication Data

US 2023/0083950 A1 Mar. 16, 2023

Related U.S. Application Data

(62) Division of application No. 15/433,582, filed on Feb. 15, 2017, now Pat. No. 11,548,094.

(51) Int. Cl.
*B29C 64/20* (2017.01)
*B22F 10/28* (2021.01)
(Continued)

(52) U.S. Cl.
CPC ............ *B23K 26/342* (2015.10); *B22F 10/28* (2021.01); *B22F 10/36* (2021.01); *B22F 12/00* (2021.01);
(Continued)

(58) Field of Classification Search
CPC .............. B29C 64/153; B23K 26/0665; B23K 26/0604; B23K 6/0648
See application file for complete search history.

(56) References Cited

U.S. PATENT DOCUMENTS 9,001,172 B2    4/2015 Ghauri
2002/0164069 A1* 11/2002 Nagano ............... B29C 64/129
                                                          382/154
(Continued)

FOREIGN PATENT DOCUMENTS

JP    2016507377 A    3/2016
JP    2017502843 A    1/2017
(Continued)

OTHER PUBLICATIONS

A Kustepeli et al., "Fields and currents due to a modulated laser beam exciting an array of narrow slots", Antennas and Propagation Society International Symposium, 1997. IEEE., 1997 Digest, vol. 02, pp. 1240-1243, Jul. 13-18, 1997, Montreal, Quebec, Canada.
(Continued)

*Primary Examiner* — Alison L Hindenlang
*Assistant Examiner* — Debjani Roy
(74) *Attorney, Agent, or Firm* — Dinsmore & Shohl LLP

(57) ABSTRACT

An additive manufacturing system includes a laser array including a plurality of laser devices. Each laser device of the plurality of laser devices generates an energy beam for forming a melt pool in a powder bed. The additive manufacturing system further includes at least one optical element. The optical element receives at least one of the energy beams and induces a predetermined power diffusion in the at least one energy beam.

10 Claims, 10 Drawing Sheets

(51) Int. Cl.

| | | |
|---|---|---|
| *B22F 10/36* | (2021.01) | |
| *B22F 12/00* | (2021.01) | |
| *B22F 12/41* | (2021.01) | |
| *B22F 12/44* | (2021.01) | |
| *B22F 12/45* | (2021.01) | |
| *B22F 12/47* | (2021.01) | |
| *B23K 26/06* | (2014.01) | |
| *B23K 26/342* | (2014.01) | |
| *B29C 64/153* | (2017.01) | |
| *B33Y 10/00* | (2015.01) | |
| *B33Y 30/00* | (2015.01) | |
| *B22F 10/10* | (2021.01) | |
| *B22F 12/49* | (2021.01) | |

(52) U.S. Cl.
CPC .............. *B22F 12/41* (2021.01); *B22F 12/44* (2021.01); *B22F 12/45* (2021.01); *B22F 12/47* (2021.01); *B23K 26/0604* (2013.01); *B23K 26/0648* (2013.01); *B23K 26/0665* (2013.01); *B29C 64/153* (2017.08); *B29C 64/20* (2017.08); *B33Y 10/00* (2014.12); *B33Y 30/00* (2014.12); *B22F 10/10* (2021.01); *B22F 12/222* (2021.01); *B22F 12/224* (2021.01); *B22F 12/49* (2021.01); *Y02P 10/25* (2015.11)

(56) References Cited

U.S. PATENT DOCUMENTS

| | | |
|---|---|---|
| 2003/0052105 A1 | 3/2003 | Nagano et al. |
| 2013/0256286 A1 | 10/2013 | Sercel et al. |
| 2014/0271328 A1 | 9/2014 | Burris et al. |
| 2015/0165556 A1* | 6/2015 | Jones .................. B29C 64/277 219/76.14 |
| 2015/0283613 A1 | 10/2015 | Backlund |
| 2016/0067827 A1 | 3/2016 | Zediker |
| 2016/0136730 A1 | 5/2016 | McMurtry et al. |
| 2016/0158889 A1 | 6/2016 | Carter et al. |
| 2017/0021455 A1 | 1/2017 | Dallarosa et al. |
| 2018/0186082 A1 | 7/2018 | Randhawa |
| 2018/0345405 A1* | 12/2018 | Ostroverkhov ........ B33Y 50/02 |

FOREIGN PATENT DOCUMENTS

| | | |
|---|---|---|
| JP | 2017503683 A | 2/2017 |
| WO | 2015091459 A1 | 6/2015 |
| WO | 2016085965 A1 | 6/2016 |
| WO | 2016201309 A1 | 12/2016 |
| WO | 2016201326 A1 | 12/2016 |

OTHER PUBLICATIONS

Martijn J R Heck, "Highly integrated optical phased arrays: photonic integrated circuits for optical beam shaping and beam steering", Nanophotonics, Jun. 2016.

International Search Report and Written Opinion issued in connection with corresponding PCT Application No. PCT/US2018/014955 dated May 4, 2018.

European Patent Office Search Report, dated Oct. 27, 2020, for related European Application No. 18754754.2 (8 pgs.), reference pp. 2-8.

English Translation of Japanese office action for application 2019-544056 dated Oct. 27, 2020 (8 pages).

Office Action for Chinese Patent Application No. 201880025271.9 dated May 8, 2021.

Office Action for Japanese Patent Application No. 2019-544056 dated May 27, 2021.

* cited by examiner

SYSTEM AND METHODS FOR FABRICATING A COMPONENT WITH LASER ARRAY

CROSS REFERENCE TO RELATED APPLICATIONS

This application claims priority to, and is a divisional of application of, U.S. patent application Ser. No. 15/433,582 filed Feb. 15, 2017, which is hereby expressly incorporated herein by reference in its entirety.

BACKGROUND

The subject matter disclosed herein relates generally to additive manufacturing systems and, more particularly, to methods and systems for fabricating a component using a laser array by inducing power diffusion in energy beams generated by the laser array.

At least some additive manufacturing systems involve the buildup of a metal component to make a net, or near net shape component. This method can produce complex components from expensive materials at a reduced cost and with improved manufacturing efficiency. At least some known additive manufacturing systems, such as direct metal laser melting (DMLM) systems, fabricate components using an expensive, high-powered laser device and a powder material, such as a powdered metal. In some known additive manufacturing systems, component quality may be reduced due to excess heat and/or variation in heat being transferred to the metal powder by the laser device within the melt pool, creating a melt pool with varying depths.

In some known additive manufacturing systems, component quality is reduced due to the variation in conductive heat transfer between the powdered metal and the surrounding solid material of the component. As a result, the melt pool produced by the laser device may become too deep, resulting in the melt pool penetrating deeper into the powder bed, pulling in additional powder into the melt pool. The increased melt pool depth may generally result in a poor surface finish of the component. In addition, in some known additive manufacturing systems, the component's dimensional accuracy and small feature resolution may be reduced due to melt pool variations because of the variability of thermal conductivity of the subsurface structures and metallic powder. As the melt pool size varies, the accuracy of printed structures can vary, especially at the edges of features. Controlling melt pool characteristics generally requires control of the heat transfer between the laser device and the melt pool including the power density of the beam spot generated by the laser device used to melt the powdered material to form the melt pool.

BRIEF DESCRIPTION

In one aspect, an additive manufacturing system is provided. The additive manufacturing system includes a laser array including a plurality of laser devices. Each laser device of the plurality of laser devices generates an energy beam for forming a melt pool in a powder bed. The additive manufacturing system further includes at least one optical element. The optical element receives at least one of the energy beams and induces a predetermined power diffusion in the at least one energy beam.

In another aspect, a method of fabricating a component in a powder bed is provided. The method includes emitting a plurality of energy beams from a plurality of laser devices of a laser array. The method further includes inducing, by an optical element, a power diffusion in at least one energy beam of the plurality of energy beams and generating a melt pool, at least in part, with the at least one diffused energy beam.

DRAWINGS

These and other features, aspects, and advantages of the present disclosure will become better understood when the following detailed description is read with reference to the accompanying drawings in which like characters represent like parts throughout the drawings, wherein.

Figure 1:
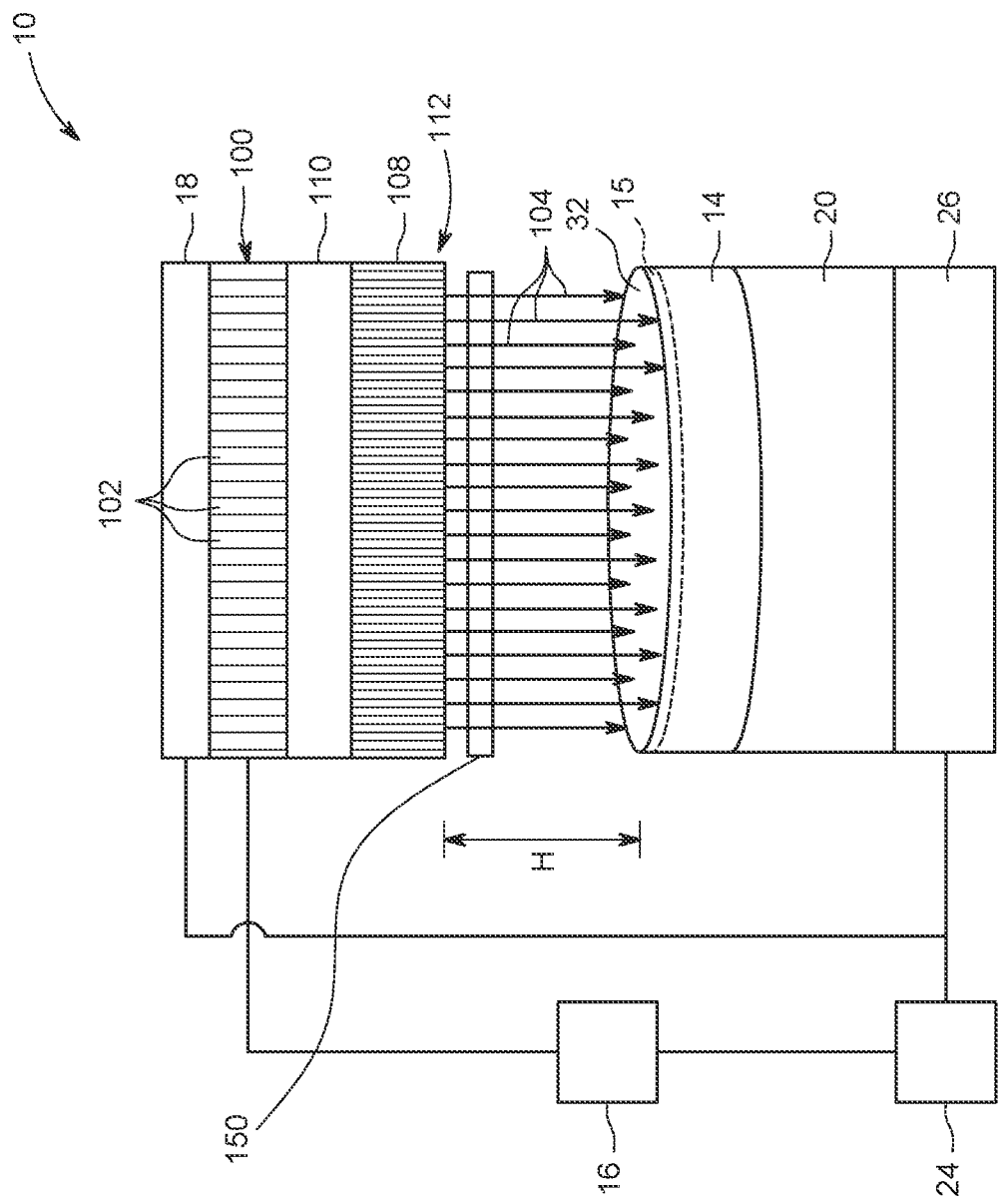
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein facilitate manipulation of energy beams generated by lasers of a laser array to generate a desired beam spot pattern and corresponding power density across the beam spot pattern. Accordingly, system and methods described herein facilitate consistent and predictable manufacturing of large areas during additive manufacturing processes. Specifically, an additive manufacturing system includes an array of laser devices and at least one optical element configured to induce a predetermined power diffusion in one or more of the energy beams generated by the laser devices. The laser array generates a beam spot pattern, which may include, without limitation, a linear beam spot pattern or a two-dimensional beam spot array. The predetermined power diffusion generally results in a spreading or elongation of the effected beam spots such that the power density across at least a portion of the beam spot pattern containing the effected beam spots is modified. Such modification can be used to, without limitation, increase the uniformity or create a desired pattern of power density across a portion of the beam spot pattern. Such beam spot pattern may include individual beam spot patterns and an aggregate spot shape when considering multiple laser sources.

In the exemplary embodiment, for example, inducing the predetermined power diffusion includes inducing engineered optical aberrations, i.e., beam distortions, to alter the laser intensity profile. Such engineered optical aberrations include, e.g., and without limitation, astigmatism in the energy beams such that an elongated beam spot having a more uniform power density is produced. As described in more detail below, predetermined power diffusions may be selectively induced in one or more of the energy beams to facilitate generation of various beam spot patterns having different characteristics. In certain embodiments, the optical elements are also coupled to an optical element actuator that repositions and/or reorients the optical elements to facilitate dynamically changing the induced power diffusion during operation of the additive manufacturing system.

FIG. 1 is a schematic view of an exemplary additive manufacturing system 10. A coordinate system 12 includes an x-axis, a y-axis, and a z-axis. In the exemplary embodiment, additive manufacturing system 10 includes a laser array 100 for fabricating a component 14 by a layer-by-layer manufacturing process. Laser array 100 includes a plurality of laser devices, or emitters, 102, each of which provides a high-intensity heat source configured to generate a melt pool 15 (not shown to scale) in a powdered material, i.e., powder bed 20 through an energy beam 104. Laser array 100 is coupled to a mounting system 18. Additive manufacturing system 10 also includes a computer control system, or controller 16. Mounting system 18 is moved by an actuator or an actuator system 24 that is configured to move mounting system 18 in an XY plane to facilitate fabricating a layer of component 14 with a sweep of laser array 100 (i.e., requiring no scanning of laser array 100). For example, and without limitation, laser array 100 is pivoted about a central point to cover a circular portion of the powder on powder bed 20, moved in a linear path, a curved path, and/or rotated. Alternatively, laser array 100 is moved in any orientation that enables additive manufacturing system 10 to function as described herein.

Actuator system 24 is controlled by controller 16 and moves laser array 100 along a predetermined path about a powder bed 20, such as, for example, and without limitation, linear and/or rotational paths. Alternatively, laser array 100 is stationary and energy beams 104 are moved along the predetermined path by one or more galvanometers (not shown), for example, and without limitation, two-dimension (2D) scan galvanometers, three-dimension (3D) scan galvanometers, dynamic focusing galvanometers, and/or any other scanning methods that may be used to deflect energy beams 104 of laser array 100.

In the exemplary embodiment, a powder bed 20 is mounted to a support structure 26, which is moved by actuator system 24. As described above with respect to mounting system 18, actuator system 24 is also configured to move support structure 26 in a Z direction (i.e., normal to a top surface of powder bed 20). In some embodiments, actuator system 24 is also configured to move support structure 26 in the XY plane. For example, and without limitation, in an alternative embodiment where laser array 100 is stationary, actuator system 24 moves support structure 26 in the XY plane to direct energy beams 104 of laser array 100 along a predetermined path about powder bed 20. In the exemplary embodiment, actuator system 24 includes, for example, and without limitation, a linear motor(s), a hydraulic and/or pneumatic piston(s), a screw drive mechanism(s), and/or a conveyor system.

In the exemplary embodiment, optical fibers 108 are disposed between laser array 100 and component 14. Optical fibers 108 are generally configured to receive energy beams 104 from laser devices 102 of laser array 100 and to direct energy beams 104 onto component 14. A height "H" defined between the array of optical fibers 108 (i.e., the free ends 112 of optical fibers 108), or bundle 110 of optical fibers 108, and a top layer 32 of component 14 is controlled by moving support structure 26 in the Z direction. The height "H" is dependent on, for example, and without limitation, a type of energy beam 104 emitted by optical fibers 108 (e.g., whether energy beams 104 are collimated, divergent, or convergent), an output power of laser array 100, a pulse energy of laser array 100, and/or a pulse width of laser array 100. More specifically. height H is determined to facilitate protecting laser devices 102 and associated optics from soot and splatter that may rise from powder bed 20. In the exemplary embodiment, free ends 112 of optical fibers 108 are located in a range between about 5 millimeters (mm) (0.197 inches (in)) to about 150 mm (5.91 in) above powder bed 20 so that any region of a layer of powder bed 20 can be melted by actuating laser array 100.

In the exemplary embodiment, at least one optical element 150 is disposed between optical fibers 108 and component 14. Optical element 150 includes, without limitation, one or more of a refractive lens, such as a cylindrical lens, and a reflective mirror. In general, light exiting the fibers is natively divergent and some form of optics is needed to focus laser beams 104 onto powder bed 20. As such, in addition to adding the beam distortions, i.e., aberrations (discussed further below), optical element 150 is further configured to provide laser beam focusing as well as some minor lens shaping to add the intended spot distortion. While, for illustrative purposes, the figures generally show light from laser devices 102 as single pencil lines or diverging lines after optic element 150, as is known in optic physics, laser beams 104 will tend to actually spread out upon transmission from laser devices 102 and optical element 150 is used to refocus them onto powder bed 20. Therefore, the primary role of optical element 150 is to focus exiting light into a small spot at the working plane. Optical element 150 may not necessarily be spherical, but rather have unequal curvatures to provide different degrees of focus in the X-Y plane to facilitate forming non-circular spots and hence facilitating smearing of one spot into another. Therefore, in addition to laser beam focusing, optical element 150 is generally configured to induce a power diffusion in one or more energy beams 104.

For purposes of this disclosure, the term "power diffusion" generally refers to a reduction in the power density of a beam spot produced by one of energy beams 104 on a surface of component 14 or powder bed 20. The reduction in power density is achieved by a spreading or smearing which results in, without limitation, one or more of an elongation of the beam spot and an increase in the area of the beam spot. In the exemplary embodiment, optical element 150 has unequal curvature in the X-Y plane, and while not purely cylindrical, it has a generally cylindrical lens configured to induce a power diffusion in at least one of energy beams 104. More particularly, optical element 150 may not be just a single optic, but may include multiple lenses operating in aggregate. For example, and without limitation, in one embodiment, optical element uses a substantially spherical lens, i.e., substantially equal curvature and focal lengths in the X-Y plane along with a second cylindrical lens stacked before or after the first lens which induces the smearing in a single dimension. The curvature of lens, refractive index (if it is not a mirrored surface) and distance between elements all contribute to the effective focal length of the complete system in the X-Y plane. As such, regardless of the specific configuration, optical element 150 induces engineered optical aberrations that include, e.g., and without limitation, astigmatism in energy beam 104 in laser beams 104 such that an elongated beam spot having a more uniform power density is produced. Astigmatism generally refers to a condition in which each of two orthogonal axial cross-sections of energy beam 104 have a different focal length. Accordingly, when a beam having astigmatism is projected at a focal length in which one of the two principal cross-sections is in focus, the other of the two principle cross-sections is not in focus. The resulting effect is the production of an elongated beam spot at each of the focal lengths.

In the exemplary embodiment, additive manufacturing system 10 is operated to fabricate component 14 from an electronic representation of the 3D geometry of component 14. The electronic representation may be produced in a computer aided design (CAD) or similar file. The CAD file of component 14 is converted into a layer-by-layer format that includes a plurality of build parameters for each layer of component 14, for example, top layer 32 of component 14. In the exemplary embodiment, component 14 is arranged electronically in a desired orientation relative to the origin of the coordinate system used in additive manufacturing system 10. The geometry of component 14 is sliced into a stack of layers of a desired thickness, such that the geometry of each layer is an outline of the cross-section through component 14 at that particular layer location. A "toolpath" or "toolpaths" are generated across the geometry of a respective layer. The build parameters are applied along the toolpath or toolpaths to fabricate that layer of component 14 from the material used to construct component 14. The steps are repeated for each respective layer of component 14 geometry. Once the process is completed, an electronic computer build file (or files) is generated, including all of the layers. The build file is loaded into controller 16 of additive manufacturing system 10 to control the system during fabrication of each layer.

After the build file is loaded into controller 16, additive manufacturing system 10 is operated to generate component 14 by implementing the layer-by-layer manufacturing process, such as a direct metal laser melting method. The exemplary layer-by-layer additive manufacturing process does not use a pre-existing article as the precursor to the final component, rather the process produces component 14 from a raw material in a configurable form, such as a powder. For example, and without limitation, a steel component can be additively manufactured using a steel powder. Additive manufacturing system 10 enables fabrication of components, such as component 14, using a broad range of materials, for example, and without limitation, metals, ceramics, glass, and polymers.

Figure 2:
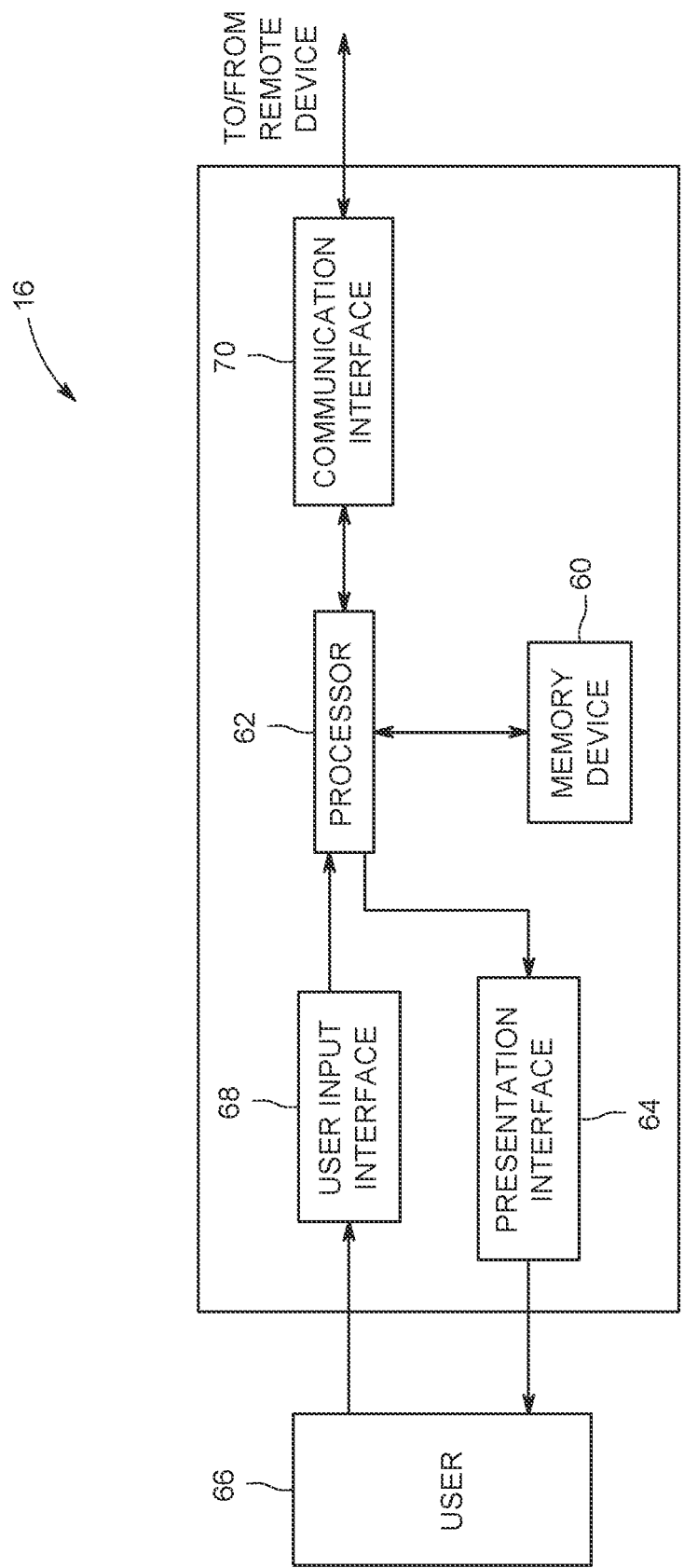
FIG. 2 is a block diagram of a controller that is used to operate the additive manufacturing system shown in FIG. 1.

FIG. 2 is a block diagram of controller 16 that is used to operate additive manufacturing system 10 (shown in FIG. 1). In the exemplary embodiment, controller 16 is one of any type of controller typically provided by a manufacturer of additive manufacturing system 10 to control operation of additive manufacturing system 10. Controller 16 executes operations to control the operation of additive manufacturing system 10 based at least partially on instructions from human operators. Controller 16 includes, for example, a 3D model of component 14 to be fabricated by additive manufacturing system 10. Operations executed by controller 16 include controlling power output of laser array 100 (shown in FIG. 1) and adjusting mounting system 18 and/or support structure 26, via actuator system 24 (all shown in FIG. 1), to control the scanning speed of laser array 100 within additive manufacturing system 10.

In the exemplary embodiment, controller 16 includes a memory device 60 and a processor 62 coupled to memory device 60. Processor 62 may include one or more processing units, such as, without limitation, a multi-core configuration. Processor 62 is any type of processor that permits controller 16 to operate as described herein. In some embodiments, executable instructions are stored in memory device 60. Controller 16 is configurable to perform one or more operations described herein by programming processor 62. For example, processor 62 may be programmed by encoding an operation as one or more executable instructions and providing the executable instructions in memory device 60. In the exemplary embodiment, memory device 60 is one or more devices that enable storage and retrieval of information such as executable instructions or other data. Memory device 60 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 60 may be configured to store any type of data, including, without limitation, build parameters associated with component 14. In some embodiments, processor 62 removes or "purges" data from memory device 60 based on the age of the data. For example, processor 62 may overwrite previously recorded and stored data associated with a subsequent time or event. In addition, or alternatively, processor 62 may remove data that exceeds a predetermined time interval. In addition, memory device 60 includes, without limitation, sufficient data, algorithms, and commands to facilitate monitoring of build parameters and the geometric conditions of component 14 being fabricated by additive manufacturing system 10.

In some embodiments, controller 16 includes a presentation interface 64 coupled to processor 62. Presentation interface 64 presents information, such as the operating conditions of additive manufacturing system 10, to a user 66. In one embodiment, presentation interface 64 includes a display adapter (not shown) coupled to a display device (not shown), such as a cathode ray tube (CRT), a liquid crystal display (LCD), an organic LED (OLED) display, or an "electronic ink" display. In some embodiments, presentation interface 64 includes one or more display devices. In addition, or alternatively, presentation interface 64 includes an audio output device (not shown), for example, without limitation, an audio adapter or a speaker (not shown).

In some embodiments, controller 16 includes a user input interface 68. In the exemplary embodiment, user input interface 68 is coupled to processor 62 and receives input from user 66. User input interface 68 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 64 and user input interface 68.

In the exemplary embodiment, a communication interface 70 is coupled to processor 62 and is configured to be coupled in communication with one or more other devices, such as laser array 100, and to perform input and output operations with respect to such devices while performing as an input channel. For example, communication interface 70 may include, without limitation, a wired network adapter, a wireless network adapter, a mobile telecommunications adapter, a serial communication adapter, or a parallel communication adapter. Communication interface 70 may receive a data signal from or transmit a data signal to one or more remote devices. For example, in some embodiments, communication interface 70 of controller 16 may transmit/receive a data signal to/from actuator system 24.

Presentation interface 64 and communication interface 70 are both capable of providing information suitable for use with the methods described herein, such as, providing information to user 66 or processor 62. Accordingly, presentation interface 64 and communication interface 70 may be referred to as output devices. Similarly, user input interface 68 and communication interface 70 are capable of receiving information suitable for use with the methods described herein and may be referred to as input devices.

Figure 3:
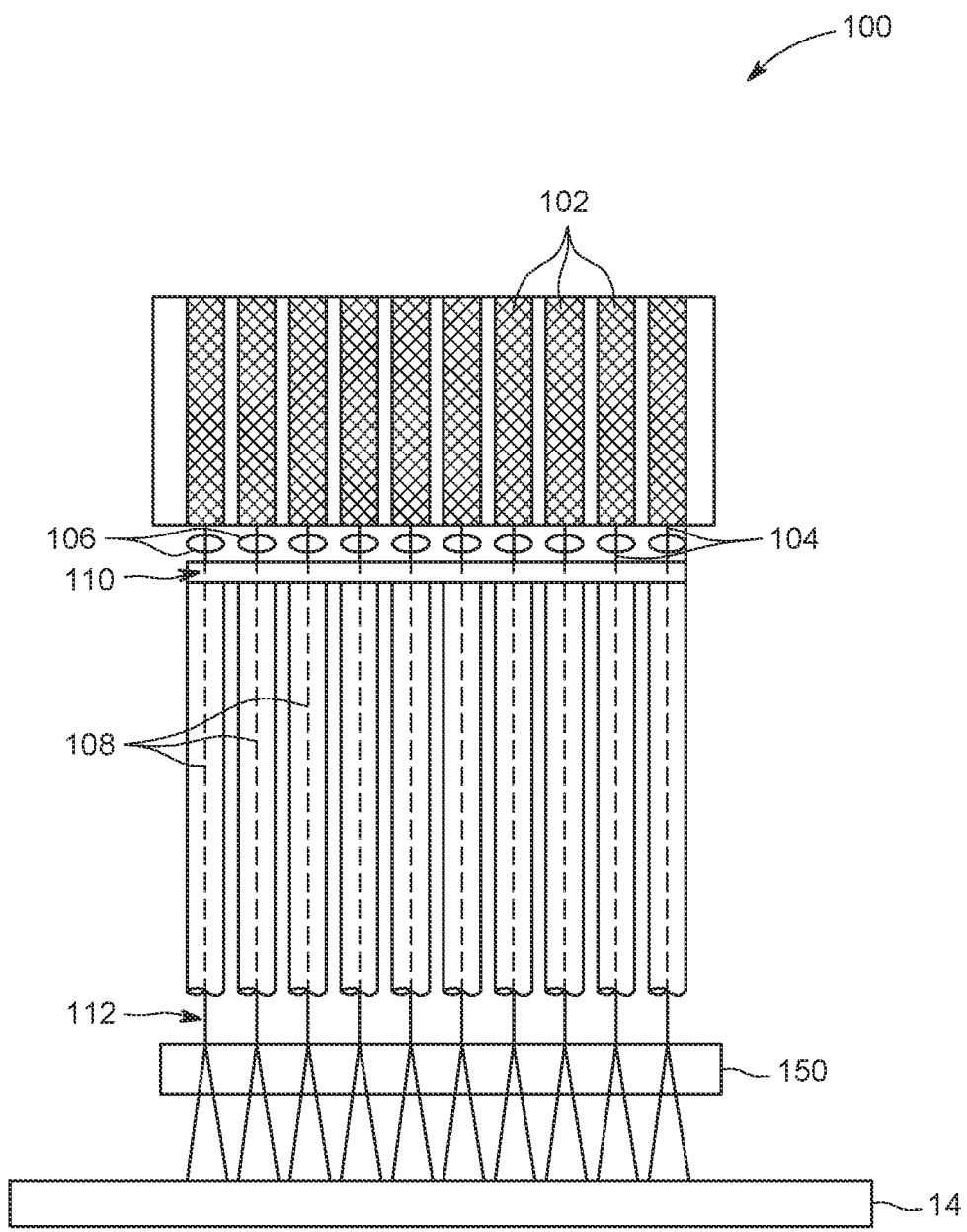
FIG. 3 is a schematic view of an exemplary laser array for use with the additive manufacturing system shown in FIG. 1.

FIG. 3 is a schematic view of laser array 100 of additive manufacturing system 10 (shown in FIG. 1). In the exemplary embodiment, laser array 100 includes plurality of laser devices 102, each of which provides a high-intensity heat source configured to generate melt pool 15 (shown in FIG. 1) in a powdered material, i.e., powder bed 20 (shown in FIG. 1). Each laser device 102 is configured to emit an energy beam 104. Laser array 100 also includes a plurality of lenses 106 positioned between laser devices 102 and a plurality of optical fibers 108. Lenses 106 are configured to couple energy beam 104 emitted by a respective laser device 102 to a respective optical fiber 108. In the exemplary embodiment, optical fibers 108 are provided in a bundle 110 between laser devices 102 and free ends 112 of optical fibers 108. In alternative embodiments, laser array 100 includes laser devices that do not use coupling optics, such as lenses 106, as discussed herein. Disposed between free ends 112 and component 14 is an optical element 150 configured to induce a power diffusion of energy beams 104 as energy beams 104 travel between free ends 112 and component 14. In the exemplary embodiment, optical element 150 is a cylindrical lens configured to induce engineered optical aberrations in energy beams 104 as energy beams 104 travel between optical fibers 108 and component 14. Alternatively, optical element 150 has any configuration that enables operation of additive manufacturing system 10 as described herein, including, without limitation, the configurations described above.

Figure 4:
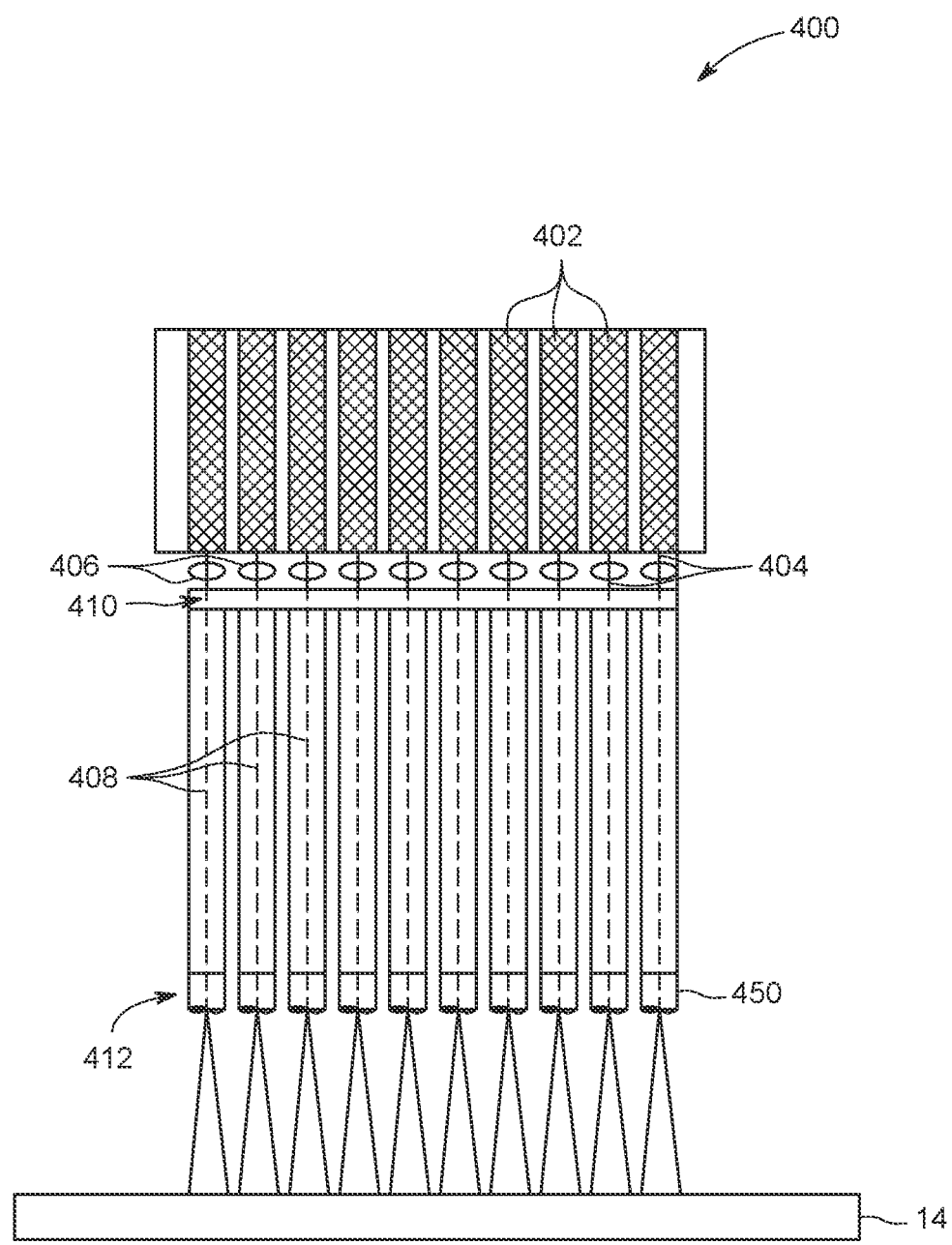
FIG. 4 is a schematic view of an alternative laser array for use with the additive manufacturing system shown in FIG. 1.

FIG. 4 is a schematic view of an alternative laser array 400 for use with additive manufacturing system 10 (shown in FIG. 1). Laser array 400 includes a plurality of laser devices 402, each of which provides a high-intensity heat source configured to generate melt pool 15 (shown in FIG. 1) in a powdered material, i.e., powder bed 20 (shown in FIG. 1). Each laser device 402 is configured to emit an energy beam 404 of laser energy. Laser array 400 also includes a plurality of lenses 406 positioned between laser devices 402 and a plurality of optical fibers 408. Lenses 406 are configured to couple energy beam 404 emitted by a respective laser device 402 to a respective optical fiber 408. In laser array 400, optical fibers 408 are provided in a bundle 410 between laser devices 402 and free ends 412 of optical fibers 408. Free ends 412 are optically coupled to optical elements 450, which are configured to induce a power diffusion in energy beams 404 as energy beams 404 exit free ends 412. As described above for optical element 150 (shown in FIGS. 1 and 3), optical elements 450 are also configured to focus laser beams 404.

Figure 5:
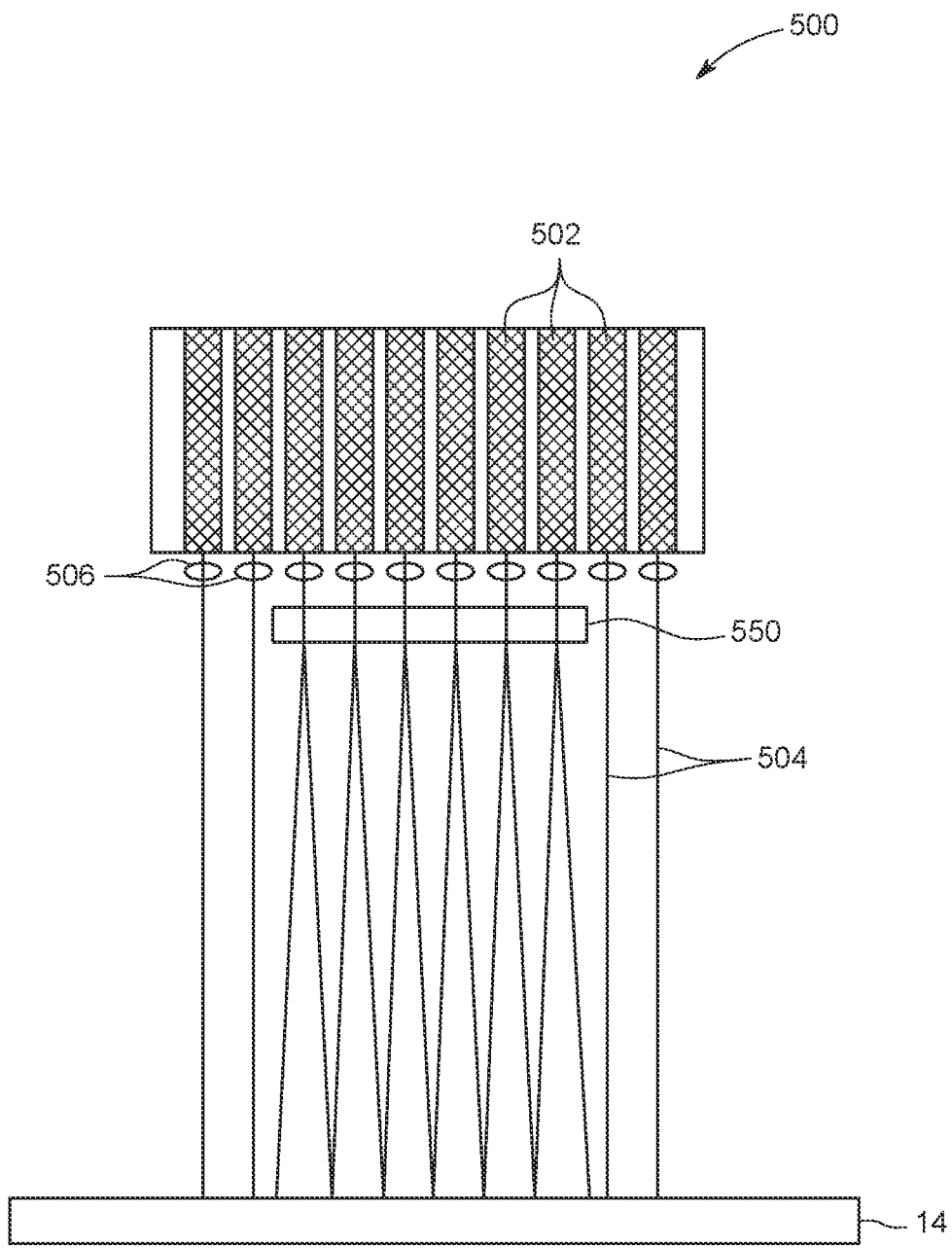
FIG. 5 is schematic view of yet another alternative laser array for use with the additive manufacturing system shown in FIG. 1.

FIG. 5 is a schematic view of yet another alternative laser array 500 for use with additive manufacturing system 10 (shown in FIG. 1). Laser array 500 includes a plurality of laser devices 502, each of which provides a high-intensity heat source configured to generate melt pool 15 (shown in FIG. 1) in a powdered material, i.e., powder bed 20 (shown in FIG. 1). Each laser device 502 is configured to emit an energy beam 504 of laser energy. Laser array 500 also includes a plurality of lenses 506 positioned adjacent laser devices 502 and configured to direct energy beams 404 emitted by respective laser devices 502. In contrast to laser array 100 and laser array 400 (shown in FIGS. 3 and 4 respectively), laser array 500 does not include optical fibers between laser devices 502 and component 14. Laser array 500 includes an optical element 550 configured to induce a power diffusion in only a subset of energy beam 504 as the subset of energy beams 504 travels between laser devices 502 and component 14.

Figure 6:
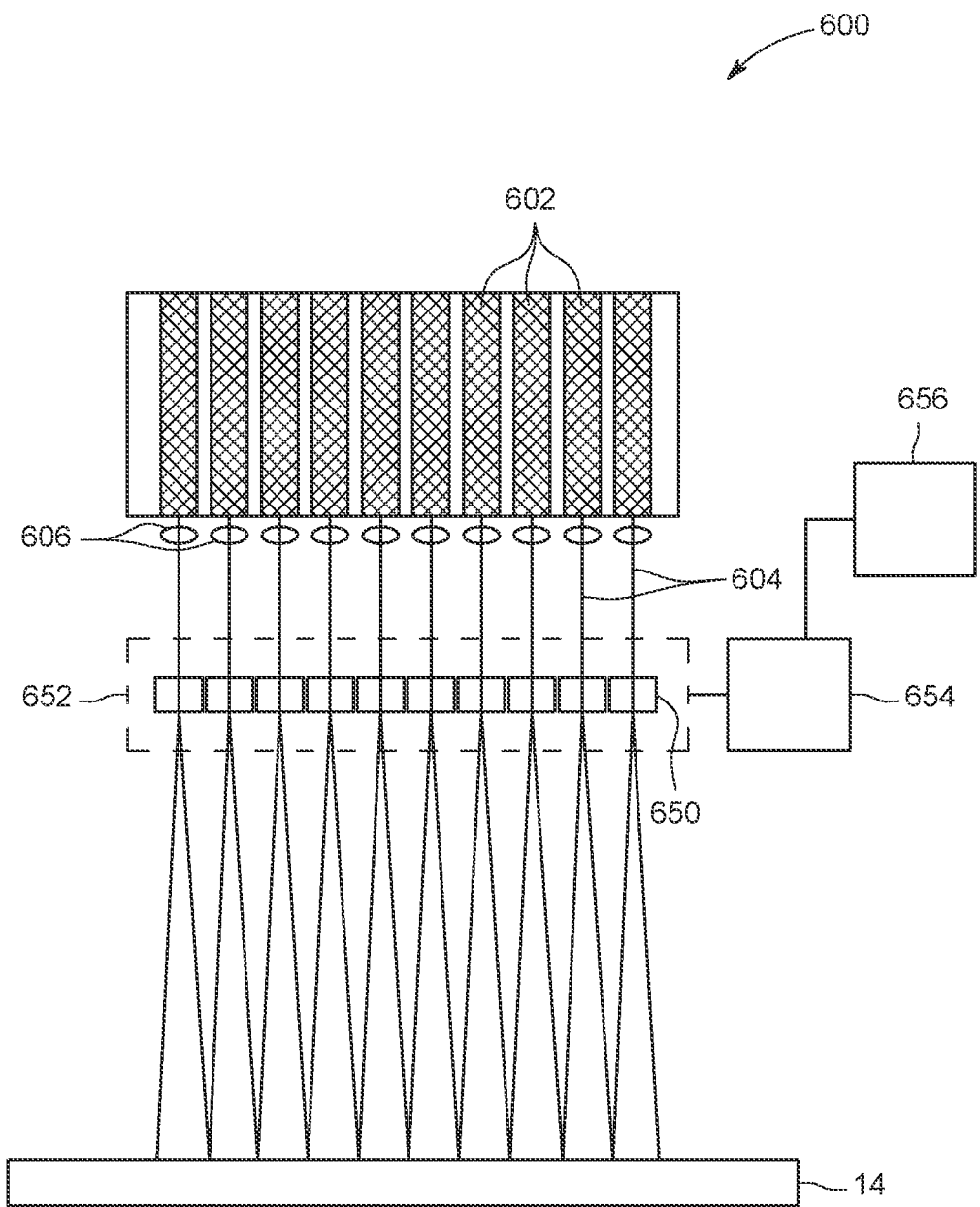
FIG. 6 is a schematic view of another alternative laser array for use with the additive manufacturing system shown in FIG. 1.

FIG. 6 is a schematic view of still another alternative laser array 600 for use with additive manufacturing system 10 (shown in FIG. 1). Laser array 600 includes a plurality of laser devices 602, each of which provides a high-intensity heat source configured to generate melt pool 15 (shown in FIG. 1) in a powdered material, i.e., powder bed 20 (shown in FIG. 1). Each laser device 602 is configured to emit an energy beam 604 of laser energy. Laser array 600 also includes a plurality of lenses 606 positioned adjacent laser devices 602 and configured to direct energy beams 604 emitted by respective laser devices 602. Laser array 600 includes a plurality of optical elements 650, each optical element 650 corresponding to a respective laser device 602, configured to induce a power diffusion in energy beams 604 as energy beams 604 travel between laser devices 602 and component 14.

In laser array 600, optical elements 650 are arranged in an optical element array 652 coupled to an optical element actuator 654. Optical element actuator 654 is configured to manipulate one or more of optical elements 650 during operation of additive manufacturing system 10. For example, in certain embodiments, optical element actuator 654 is configured to manipulate optical element array 652 as a whole. In other embodiments, optical element actuator 654 is coupled to and configured to manipulate only a subset of optical elements 650. In still other embodiments, laser array 600 includes a plurality of optical element actuators 654, each optical element actuator configured to individually manipulate one or more optical elements 650 of the optical element array 652.

Optical element actuator 654 is generally configured to manipulate one or more of optical elements 650 by changing one or more of an orientation and displacement of the one or more optical elements 650. The displacement and orientation may be relative to laser devices 602, component 14, or any other suitable component of additive manufacturing system 10. By changing orientation and/or position of optical elements 650, optical element actuator 654 facilitates dynamic modification of the power diffusion of energy beams 604. For example, in one embodiment, an optical element 650 may produce a first power diffusion when in a first orientation and a second power diffusion in a second orientation and optical element actuator 654 may selectively change optical element 650 from the first orientation to the second orientation. In other embodiments, optical element actuator 654 is configured to remove an optical element 650 from the path of an energy beam 604 such that the energy beam 604 is not subject to power diffusion. In still other embodiments, optical element actuator 654 is configured to selectively exchange a first optical element with one or more second optical elements to facilitate changing power diffusion.

To facilitate control of optical element actuator 654, optical element actuator 654 may be communicatively coupled to an optical element actuator controller 656. In certain embodiments, optical element actuator controller 656 is communicatively coupled to controller 16 (shown in FIGS. 1 and 2) and configured to receive instructions from controller 16. In alternative embodiments, optical element actuator controller 656 is integrated into controller 16.

Figure 7:
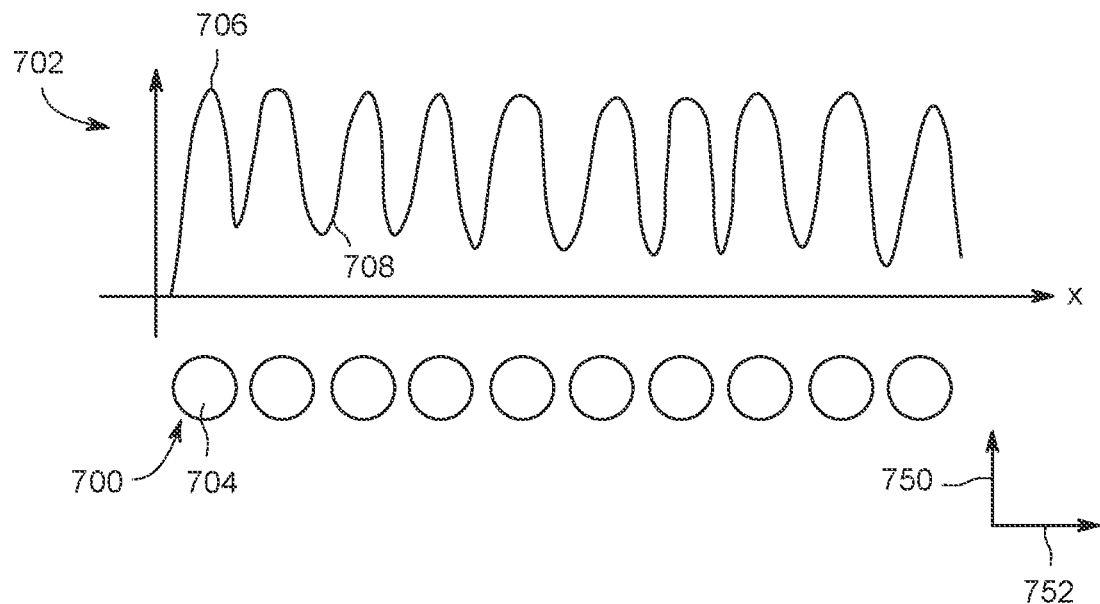
FIG. 7 is a schematic diagram of a linear beam spot pattern and corresponding power density distribution without an induced power diffusion.

FIG. 7 is a schematic diagram of a linear beam spot pattern 700 and a corresponding power density distribution 702 without induced power diffusion. Power density distribution 702 is shown as incoherent irradiance (power per unit area) as a function of spatial position with respect to the x-axis (shown in FIG. 1). Referencing FIGS. 1, 3, and 7, beam spot pattern 700 is provided as a reference pattern of beam spots 704. More specifically, beam spot pattern 700 corresponds to an unaltered beam spot pattern, such as would be produced by energy beams 104 generated by laser devices 102 during operation of additive manufacturing system 10 absent power diffusion by optical element 150. As indicated in power density distribution 702, each beam spot 704 generally includes a peak power intensity 706 at the center of each beam spot 704 that declines to low power at the extent of each beam spot 704. Accordingly, as laser array 100 sweeps in a first direction 750 during a manufacturing process, laser array 100 may not adequately melt powdered material disposed within low power intensity gaps 708. Similarly, as laser array 100 sweeps in a second direction 752, low power intensity gaps 708 may result in unwanted cooling of melt pool 15 (shown in FIG. 1).

Figure 8:
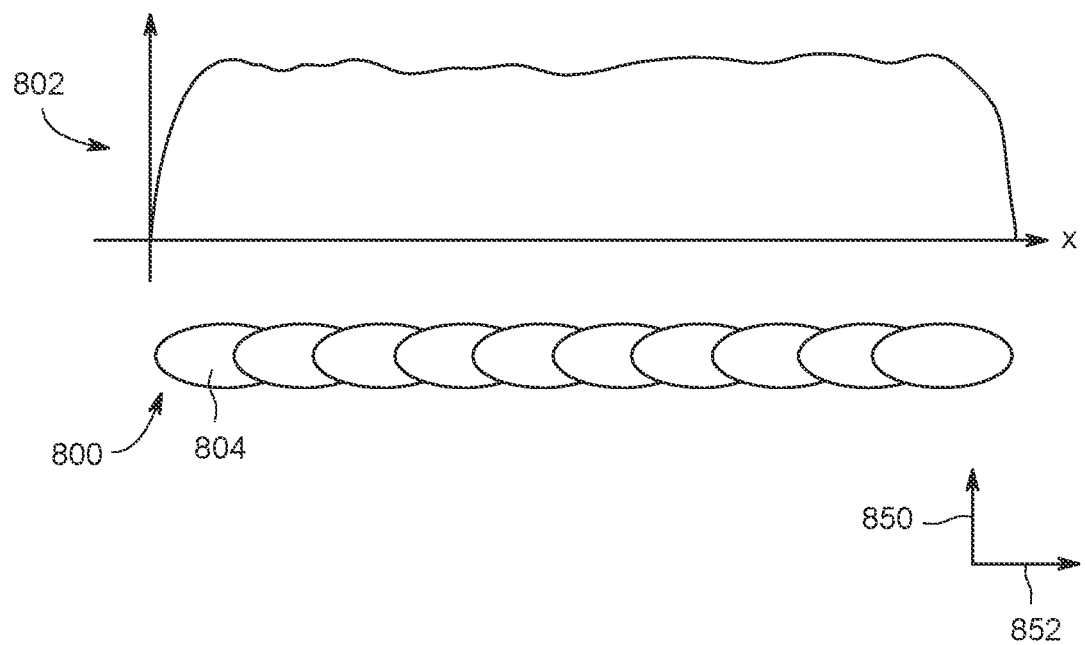
FIG. 8 is a schematic diagram of a first beam spot pattern and a corresponding power density distribution that may be produced by inducing a first power diffusion to the beam spot pattern of FIG. 7.

FIG. 8 is a schematic diagram of first beam spot pattern 800 and a corresponding power density distribution 802 that may be produced by inducing a first power diffusion to beam spot pattern 700 (shown in FIG. 7). Power density distribution 802 is shown as incoherent irradiance (power per unit area) as a function of spatial position with respect to the x-axis (shown in FIG. 1). In contrast to the substantially circular beam spots 704 of beam spot pattern 700 (shown in FIG. 7), beam spots 804 are subject to power diffusion facilitated by an optical element, such as optical element 150 (shown in FIGS. 1 and 3). For example, in certain embodiments, optical element 150 induces an engineered optical aberration in each of beams 104 such that elongated beam spots 804 are produced on the surface of component 14. As indicated in power density distribution 802, the resulting arrangement of elongated beam spots 804 produces a more uniform power distribution across a beam pattern length 856 of beam spot pattern 800 as compared to beam spot pattern 700. Accordingly, as laser array 100 is translated in a first direction 850, relatively uniform power density is provided across beam spot pattern 800, thereby approximating a single, wide beam. Similarly, as laser array 100 is translated in a second direction 852, relatively uniform power is provided along the length of beam spot pattern 800 as compared to beam spot pattern 700, thereby providing more uniform power exposure as beam spot pattern 800 is translated in second direction 852.

FIGS. 9-12 are schematic diagrams of alternative beam spot patterns that may be produced using additive manufacturing machines in accordance with this disclosure, such as additive manufacturing system 10 (shown in FIG. 1).

Figure 9:
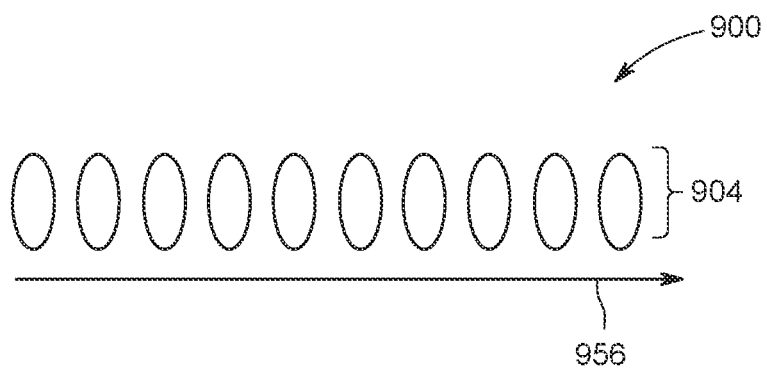
FIG. 9 is a schematic diagram of a second beam spot pattern that may be produced by inducing a second power diffusion to the beam spot pattern of FIG. 7.

FIG. 9 shows a second beam spot pattern 900 that may be produced by inducing a second power diffusion to the beam spot pattern of FIG. 7. To produce second beam spot pattern 900, one or more optical elements, such as optical element 150 (shown in FIG. 1), induce a power diffusion such that beam spots 904 are elongated in a direction substantially perpendicular to a beam pattern length 956.

Figure 10:
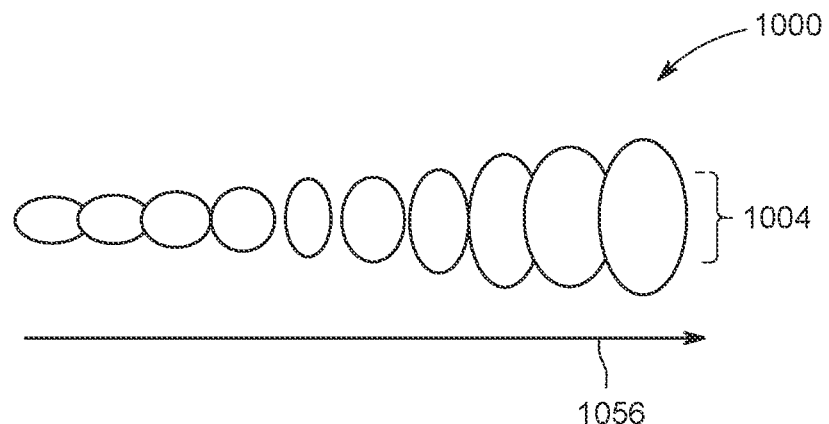
FIG. 10 is a schematic diagram of a third beam spot pattern that may be produced by inducing a third power diffusion to the beam spot pattern of FIG. 7.

FIG. 10 shows a third beam spot pattern 1000 that may be produced by inducing a third power diffusion to the beam spot pattern of FIG. 7. To produce third beam spot pattern 1000, one or more optical elements, such as optical element 150 (shown in FIG. 1), induce a power diffusion that varies across a beam pattern length 1056. More specifically, the one or more optical elements induce a power diffusion that causes the beam spots of beam spot pattern 1000 to progressively vary from being elongated in a direction substantially parallel to beam pattern length 1056 to a direction substantially perpendicular to beam pattern length 1056. Beam spot pattern 1000 further exhibits diffusion of beam spots 1004 such that beam spots 1004 increase in area along a portion of beam pattern length 1056. In alternative embodiments, beam spots 1004 of beam spot pattern 1000 vary in other ways along beam pattern length 1056 including varying, without limitation, one or more of elongation, area, decreasing in area, and orientation.

Figure 11:
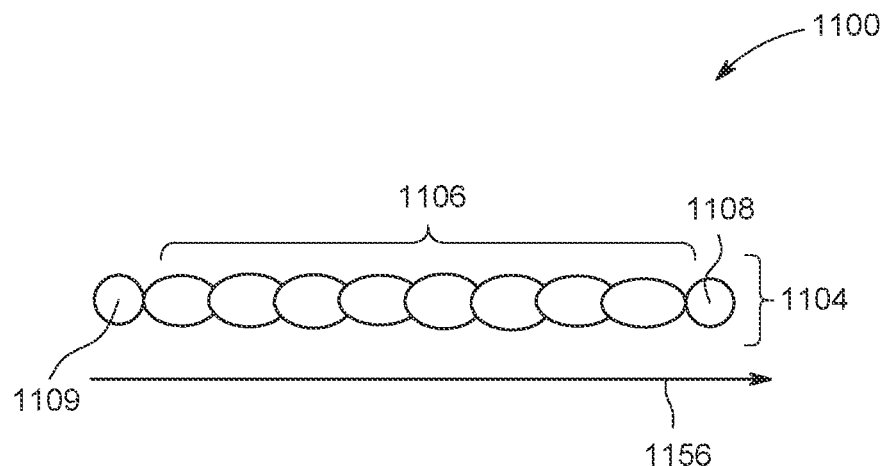
FIG. 11 is a schematic diagram of a fourth beam spot pattern that may be produced by inducing a fourth power diffusion to the beam spot pattern of FIG. 7.

FIG. 11 shows a fourth beam spot pattern 1100 that may be produced by inducing a fourth power diffusion to the beam spot pattern 700 of FIG. 7. To produce fourth beam spot pattern 1100, one or more optical elements, such as optical element 150 (shown in FIG. 1), induce a power diffusion to one or more subsets of beams 104 (shown in FIG. 1). For example, in beam spot pattern 1100, the one or more optical elements induce a power diffusion that elongates a beam spot subset 1106 of beam spots 1104 in a direction substantially parallel with a beam pattern length 1156. In contrast, extent beam spots 1108 are not subject to power diffusion and have higher power density than beam spot subset 1106. Due to the increased power density of extent beam spots 1108, beam spot pattern 1100 facilitates formation of components having more clearly defined edges. In alternative embodiments, beam spot subset 1106 may be oriented in any suitable direction including, without limitation, substantially perpendicular to beam pattern length 1156 and diagonal with respect to beam pattern length 1156.

Figure 12:
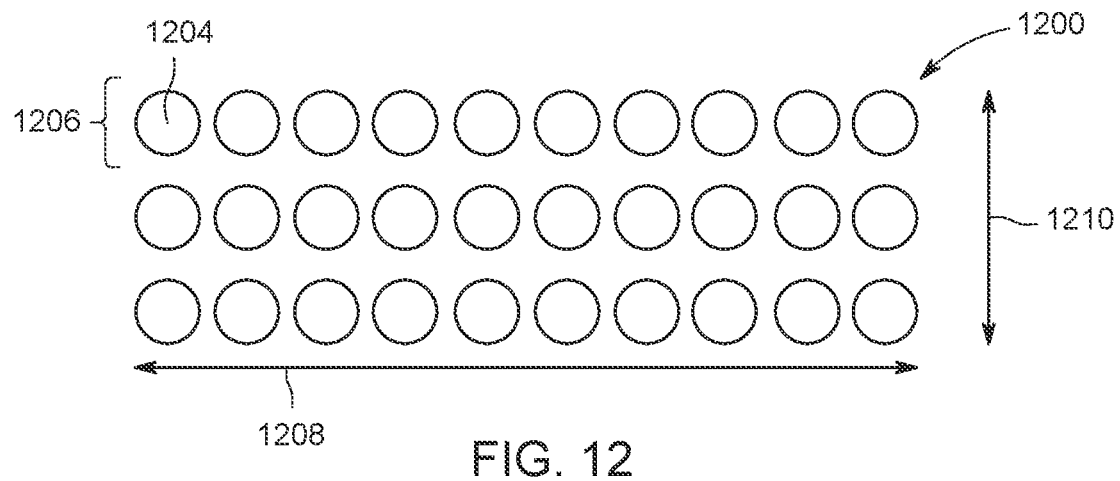
FIG. 12 is a schematic diagram of a beam spot array without an induced power diffusion.

FIG. 12 is a schematic diagram of a beam spot array 1200 without induced power diffusion. Beam spot array 1200 is intended to illustrate a reference pattern of beam spots 1204. More specifically, beam spot array 1200 corresponds to an unaltered beam spot array such as would be produced by an additive manufacturing system having a two-dimensional laser array and absent power diffusion by an optical element. Beam spot array 1200 generally includes a two-dimensional arrangement of beam spots 1204 arranged in a plurality of beam spot rows 1206 defining a beam spot array length 1208 and a beam spot array width 1210.

Figure 13:
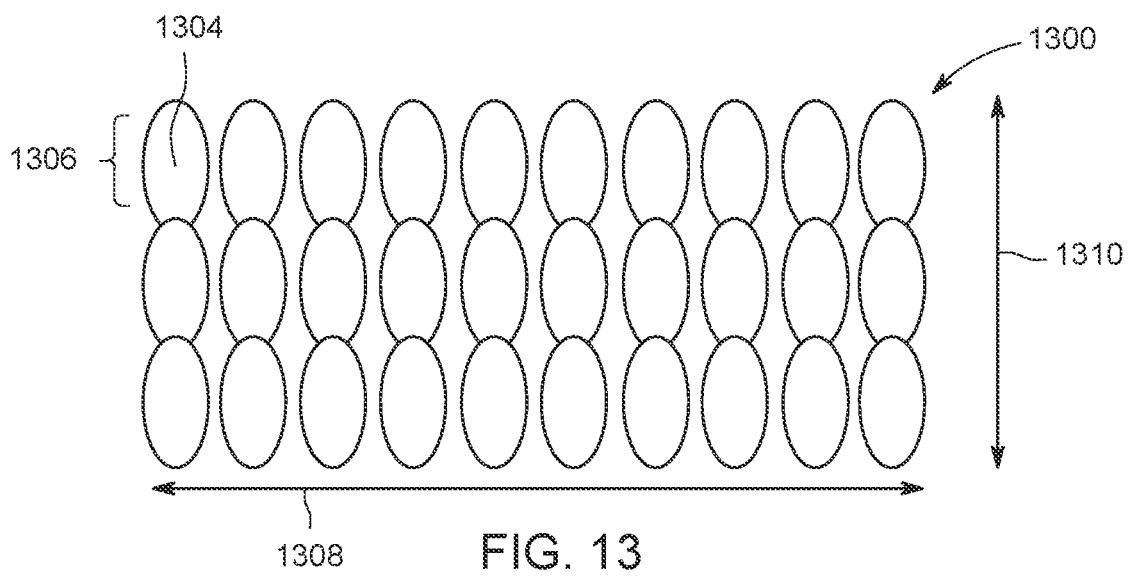
FIG. 13 is a schematic diagram a first beam spot array that may be produced by inducing a first power diffusion to the beam spot array of FIG. 12.
Figure 14:
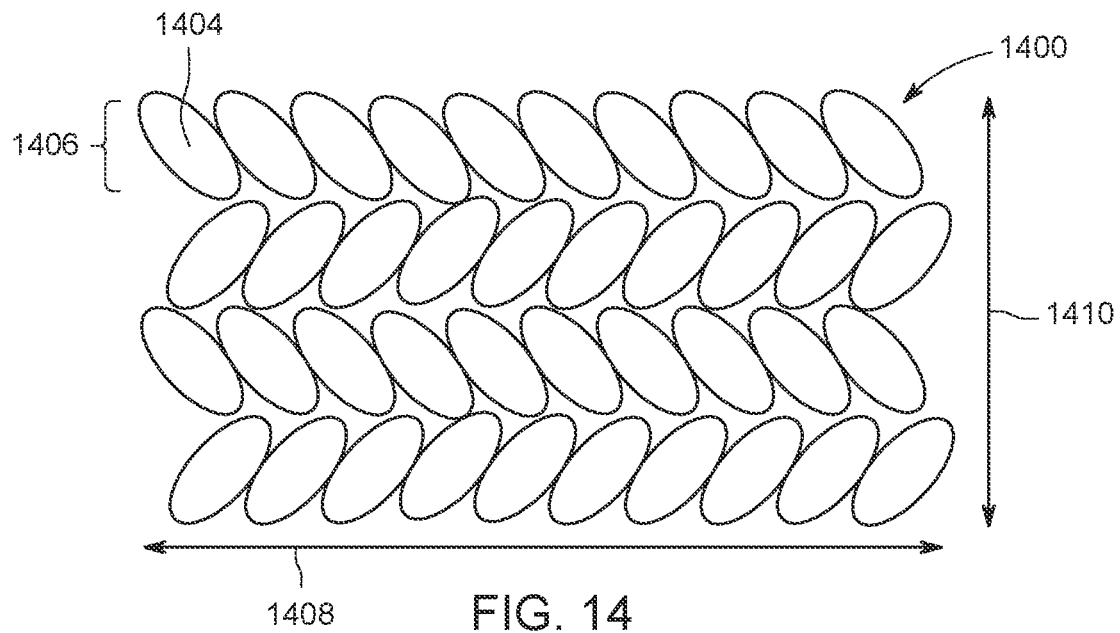
FIG. 14 is a schematic diagram of a second beam spot array that may be produced by inducing a second power diffusion to the beam spot array of FIG. 12.

FIGS. 13 and 14 are schematic diagrams of alternative beam spot arrays that may be produced using additive manufacturing machines in accordance with this disclosure, such as additive manufacturing system 10 (shown in FIG. 1).

FIG. 13 is a schematic diagram of a first beam spot array 1300 that may be produced by inducing a first power diffusion to the beam spot array 1200 of FIG. 12. To produce first beam spot array 1300, one or more optical elements, such as optical element 150 (shown in FIG. 1), induce a power diffusion to one or more of beams 104 (shown in FIG. 1). For example, beam spot array 1300 generally includes a two-dimensional arrangement of beam spots 1304 arranged in a plurality of beam spot rows 1306 defining a beam spot array length 1308 and a beam spot array width 1310. In the exemplary embodiment, the one or more optical elements 150 induce a power diffusion that elongates each beam spot 1304 in a direction that is substantially perpendicular to beam spot array length 1308, i.e., in the direction of beam spot array width 1310. Alternatively, the one or more optical elements 150 induce a power diffusion that elongates each beam spot 1304 in a direction that is substantially perpendicular to beam spot array width 1310, i.e., in the direction of beam spot array length 1308. In other alternative embodiments, the one or more optical elements 150 induce other power diffusions, such as those described in FIGS. 9-12 with respect to a linear beam spot pattern. For example, the one or more optical elements may induce a power diffusion that results in, without limitation, one or more of a predetermined elongation, diffusion, and orientation of one or more of beam spots 1304.

FIG. 14 is a schematic diagram of a second beam spot array 1400 that may be produced by inducing a second power diffusion to the beam spot array 1200 of FIG. 12. To produce second beam spot array 1400, one or more optical elements, such as optical element 150 (shown in FIG. 1), induce a power diffusion to energy beams 104 (shown in FIG. 1). In beam spot array 1400, beam spots 1404 are arranged in a plurality of beam spot rows 1406. For example, beam spot array 1400 generally includes a two-dimensional arrangement of beam spots 1404 arranged in a plurality of beam spot rows 1406 defining a beam spot array length 1408 and a beam spot array width 1410. The one or more optical elements 150 induce a power diffusion that elongates and reorients each beam spot 1404. More specifically, beam spots 1404 in each beam spot row 1406 are elongated and reoriented in a direction substantially diagonal relative to beam spot rows 1406, i.e., diagonal to beam spot array length 1408 and beam spot array width 1410. Further, beam spots 1404 are reoriented to extend perpendicularly with respect to beam spots 1404 in adjacent beam spot rows 1406. For example, each beam spot 1404 in a first beam spot row 1404 is elongated in a first diagonal direction and a second beam spot row is elongated in a second diagonal direction substantially perpendicular to the first diagonal direction. The resulting beam spot array 1400 provides a substantially uniform power density across the full area of beam spot array 1400, particularly as compared to the unaltered beam spot array 1200 shown in FIG. 12. In other alternative embodiments, beam spots 1404

Figure 15:
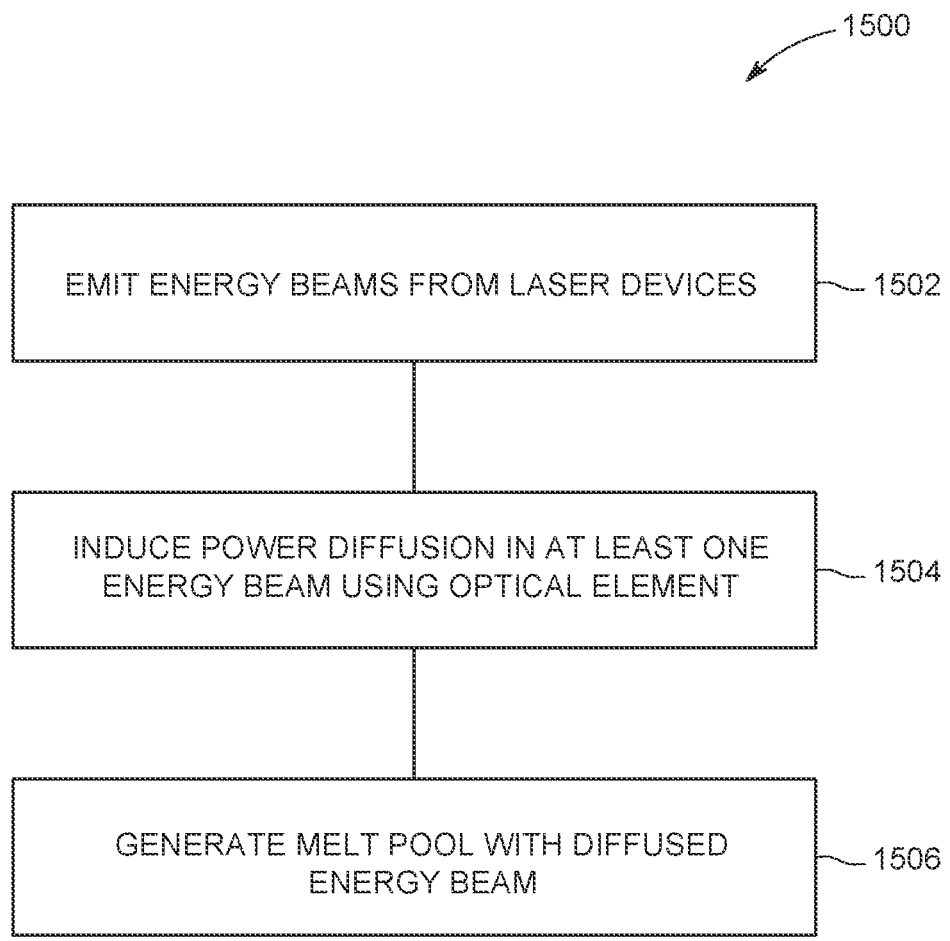
FIG. 15 is a flow chart illustrating a method for fabricating a component in a powder bed.

FIG. 15 is a flow chart illustrating a method 1500 for fabricating a component 14 in a powder bed. Referring to FIGS. 3 and 15, method 1500 includes emitting 1502 a plurality of energy beams 104 from a plurality of laser devices 102 of a laser array 100. Laser array 100 and, more specifically, laser devices 102 are arranged to produce a beam spot pattern. In certain embodiments, laser devices 102 are arranged in a substantially linear configuration to produce a corresponding linear beam spot pattern. In alternative embodiments, laser devices are arranged in a two-dimensional array to produce a corresponding two-dimensional beam spot array.

Method 1500 further includes inducing 1502, by an optical element 150, a power diffusion in at least one of energy beams 104. Optical element 150 is generally disposed between laser devices 102 and component 14 such that as energy beam 104 travels from laser device 102 to component 14, optical element 150 induces a power diffusion in energy beam 104. The power diffusion induced by optical element 150 generally results in one or more of elongation, diffusion, and reorientation of a beam spot corresponding to beam 104. For example, in the exemplary embodiment, power diffusion is induced by inducing astigmatism in energy beam 104 such that the resulting beam spot is elongated. In certain embodiments optical element 150 includes, without limitation, at least one of a refractive lens (such as a cylindrical lens) and a reflective mirror.

Method 1500 further includes generating 1504 a melt pool with the at least one diffused energy beam. As described in more detail above in the context of FIG. 1, the diffused energy beam 104 is directed to a powder bed 20 and used to selectively melt powder of powder bed 20 into melt pool 15. At the melt pool cools and solidifies, a portion of a layer of component 14 is formed.

The embodiments described herein improve control of energy beams produced by laser devices of an array of lasers for use in an additive manufacturing process. More specifically, the embodiments describe herein facilitate inducement of a predetermined power diffusion in the energy beams and, as a result, generation of a beam spot pattern having a predetermined power density distribution. Such control facilitates tailoring the power density distribution to improve the overall additive manufacturing process. For example, the systems and methods described herein can be used to form preferential melt pool characteristics, such as a consistent melting depth. The system and methods further facilitate additive manufacturing of large areas as compared to single laser systems, reducing manufacturing time and costs for a given component An exemplary technical effect of the methods, systems, and apparatus described herein includes at least one of: (a) controlling power density of a beam spot pattern generated by a laser array; (b) generating a beam spot pattern having a predetermined power density by inducing a predetermined power diffusion in one or more beams of the laser array; and (c) dynamically changing a power density of a beam spot pattern by manipulating one or more optical elements.

Exemplary embodiments of additive manufacturing systems including a laser array and optical element configured to induce a predetermined power diffusion are described above in detail. The systems and methods described herein are not limited to the specific embodiments described, but rather, components of systems and/or steps of the methods may be utilized independently and separately from other components and/or steps described herein. For example, the methods may also be used in combination with other laser fabrication systems and methods, and are not limited to practice with only the systems and methods, as is described herein. Rather, the exemplary embodiments can be implemented and utilized in connection with many additive manufacturing system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a component in a powder bed comprising:
    emitting a plurality of energy beams from a plurality of laser devices of a laser array;
    inducing, by an optical element, a power diffusion in at least one energy beam of the plurality of energy beams providing a diffused energy beam; and
    generating a melt pool, at least in part, with the diffused energy beam, wherein:
    emitting the plurality of energy beams produces a plurality of beam spots defining a beam spot pattern having a beam spot pattern length and a beam spot pattern width, each beam spot of the beam spot pattern corresponding to one of the energy beams, and
    inducing the power diffusion elongates at least one of the beam spots in a direction that is at least one of substantially parallel to the beam spot pattern length and substantially parallel to the beam spot pattern width.

2. The method of claim 1, wherein inducing the power diffusion in at least one energy beam of the plurality of energy beams further comprises inducing beam distortion in the at least one energy beam.

3. A method of fabricating a component in a powder bed comprising:
    emitting a plurality of energy beams from a plurality of laser devices of a laser array;
    inducing, by an optical element, a power diffusion in at least one energy beam of the plurality of energy beams to providing a diffused energy beam;
    generating a melt pool, at least in part, with the diffused energy beam;
    wherein emitting the plurality of energy beams produces a plurality of beam spots defining a beam spot pattern having a beam spot pattern length and a beam spot pattern width, each beam spot of the beam spot pattern corresponding to a respective energy beam; and
    diagonally elongating, by the power diffusion, at least one of the beam spots relative to each of the beam spot pattern length and the beam spot pattern width.

4. The method of claim 3, further comprising varying the power diffusion along the beam spot pattern length.

5. The method of claim 4, further comprising varying the power diffusion by at least one of increasing along a portion of the beam spot pattern length, decreasing along a portion of the beam spot pattern length, and having a first power diffusion at extents of the beam spot pattern and a second power diffusion within the beam spot pattern.

6. The method of claim 3, further comprising receiving, at a plurality of optical fibers, an energy beam from a corresponding laser device of said plurality of laser devices.

7. The method of claim 6, further comprising integrating said optical element into a free end of at least one optical fiber of said plurality of optical fibers.

8. The method of claim 3, wherein:
the beam spot pattern includes a plurality of beam spot rows; and
diagonally elongating, by the power diffusion, each beam spot in a first beam spot row of the plurality of beam spot rows in a first diagonal direction relative to each of the beam spot pattern length and the beam spot pattern width.

9. The method of claim 8, further comprising diagonally elongating, by the power diffusion, each beam spot in a second beam spot row of the plurality of beam spot rows in a second diagonal direction substantially perpendicular to the first diagonal direction.

10. A method of fabricating a component in a powder bed comprising:

emitting a plurality of energy beams from a plurality of laser devices of a laser array;

inducing, by an optical element, a power diffusion in at least one energy beam of the plurality of energy beams providing a diffused energy beam;

generating a melt pool, at least in part, with the diffused energy beam;

producing, by the plurality of laser devices, a plurality of beam spots defining a beam spot pattern having a beam spot pattern length, each beam spot of the beam spot pattern corresponding to a respective energy beam;

elongating, by the power diffusion, at least one of the beam spots in a direction that is at least one of substantially parallel and substantially perpendicular to the beam spot pattern length; and varying the power diffusion along the beam spot pattern length.

* * * * *